(12) United States Patent
Shen et al.

(10) Patent No.: US 11,447,199 B2
(45) Date of Patent: Sep. 20, 2022

(54) GUARD FOR VEHICLE BLIND SPOT MONITOR

(71) Applicant: TOYOTA MOTOR ENGINEERING & MANUFACTURING NORTH AMERICA, INC., Plano, TX (US)

(72) Inventors: Mingher F. Shen, Ann Arbor, MI (US); Salem Bensalem, Lansing, MI (US)

(73) Assignee: TOYOTA MOTOR ENGINEERING & MANUFACTURING NORTH AMERICA, INC., Plano, CA (US)

( * ) Notice: Subject to any disclaimer, the term of this patent is extended or adjusted under 35 U.S.C. 154(b) by 261 days.

(21) Appl. No.: 16/798,037

(22) Filed: Feb. 21, 2020

(65) Prior Publication Data

US 2021/0261211 A1 Aug. 26, 2021

(51) Int. Cl.
*B62D 65/16* (2006.01)
*G01S 13/931* (2020.01)
*B60R 21/0134* (2006.01)
*G01S 7/02* (2006.01)

(52) U.S. Cl.
CPC ............ *B62D 65/16* (2013.01); *G01S 13/931* (2013.01); *B60R 21/0134* (2013.01); *G01S 7/027* (2021.05); *G01S 2013/93272* (2020.01); *G01S 2013/93275* (2020.01)

(58) Field of Classification Search
CPC .............................. B62D 65/16; G01S 13/931; G01S 2013/9327
See application file for complete search history.

(56) References Cited

U.S. PATENT DOCUMENTS

| | | | |
|---|---|---|---|
| 6,428,645 B1* | 8/2002 | Rau | F16F 1/3842 428/416 |
| 8,690,206 B1 | 4/2014 | Yamasaki et al. | |
| 9,132,791 B2 | 9/2015 | Yamasaki et al. | |
| 10,160,292 B2 | 12/2018 | Chin | |
| 2008/0315050 A1 | 12/2008 | Buckley et al. | |
| 2014/0111950 A1* | 4/2014 | Yamasaki | B60R 16/0239 361/747 |
| 2019/0366936 A1 | 12/2019 | Kumashiro et al. | |

FOREIGN PATENT DOCUMENTS

WO 02084875 A2 10/2002

* cited by examiner

*Primary Examiner* — Vladimir Magloire
*Assistant Examiner* — Artem Melkunov
(74) *Attorney, Agent, or Firm* — Haynes and Boone, LLP (57) ABSTRACT

Disclosed is a sensor device. The sensor device includes a sensor configured to be attached between a rear wheel of a vehicle and a rear body cover of the vehicle, configured to detect objects in proximity to the vehicle through the rear body cover. The sensor device also includes a vertical guard configured to be attached to the vehicle, such that the sensor is protected from adhesion of materials directed rearward by the rear wheel, and an angled guard coupled to the vertical guard and extending underneath the sensor and towards the rear body cover, such that a portion of the rear body cover, through which the sensor emits a signal for detecting objects in proximity to the vehicle, is protected from adhesion of materials directed rearward by the rear wheel.

17 Claims, 11 Drawing Sheets

GUARD FOR VEHICLE BLIND SPOT MONITOR

TECHNICAL FIELD

The subject matter described herein relates to devices and methods for guarding a blind spot monitor of a vehicle against mud and impacts. This technology has particular but not exclusive utility for cars and trucks.

BACKGROUND

Vehicles typically have blind spots, where structural elements of the vehicle prevent the driver from being able to see, either directly or through mirrors. Objects located in blind spots may present a hazard during backing, lane changes, and at other times. Many modern vehicles therefore include a blind spot monitor (BSM) system that warns drivers about obstacles (e.g., posts, pedestrians, other vehicles, etc.) located in the vehicle's blind spots. These systems can be used for example to warn a driver against backing up or making lane changes when an obstacle is present in a blind spot. The system incorporates sensors (e.g., radar sensors) into the vehicle (e.g., at the left and right edges of the rear bumper), and provides warning indicators visible to the driver (e.g., on or near the side view mirrors, or on the dashboard). Correct alignment of the sensors may be necessary for the proper functioning of the system. Water splash that affects the alignment or integrity of the sensor housing may be problematic. In vehicles without underbody covers, external material such as mud, clay, and slush can be splashed or flung into the inner side of the rear bumper area by the rear tire. Once that material builds up on the BSM sensor unit itself, or on the inner side of the bumper, the signals (e.g., radar signals) emitted and received by the blind spot monitor may be partially or completely blocked, and the device may therefore no longer operate properly. In addition, blind spot monitors are often positioned such that the collision of an object with the rear bumper compresses the blind spot monitor between the bumper and a body panel, causing damage to, or destruction of, the blind spot monitor. A need exists for improved blind spot monitoring systems that address these and other concerns.

The information included in this Background section of the specification, including any references cited herein and any description or discussion thereof, is included for technical reference purposes only and is not to be regarded as limiting.

SUMMARY

Disclosed is a blind spot monitor guard or splash guard that provides a shield or guard that can block splashing of external material from reaching the blind spot monitor (BSM) sensor area. The disclosed blind spot monitor guard limits splashing of external material (mud, clay, sticky residue, etc.) that can build up on or behind the BSM sensor, potentially leading to signal interference or other malfunctions. The blind spot monitor guard may also provide additional protection to the BSM in the case of a rear impact collision.

The splash guard may for example be integrated into the BSM mounting bracket. The guard may transition from straight to angled where it extends below the BSM sensor unit. The guard can act as a barrier that blocks material that is splashed/flung by the tire, and may be designed to cover the maximum area possible without causing signal interference. This BSM guard will also provide some protection to the BSM sensor in case of rear impact. The BSM guard will protect the BSM unit from external (e.g., splashed) material, by blocking any incoming material from reaching or adhering to the BSM area.

The blind spot monitor guard disclosed herein has particular, but not exclusive, utility for improving the function of blind spot monitoring systems in cars and trucks that lack an underbody cover. One general aspect of the blind spot monitor guard includes a sensor device that includes a sensor configured to be attached between a rear wheel of a vehicle and a rear body cover of the vehicle, where the sensor is configured to detect objects in proximity to the vehicle through the rear body cover; a vertical guard configured to be attached to the vehicle, such that the sensor is protected from adhesion of materials directed rearward by the rear wheel; and an angled guard coupled to the vertical guard and extending underneath the sensor and towards the rear body cover, where a portion of the rear body cover, through which the sensor emits a signal for detecting objects in proximity to the vehicle, is protected from adhesion of materials directed rearward by the rear wheel.

Implementations may include one or more of the following features. The device where the sensor includes a radar sensor, and where the rear body cover is transparent to radar. The device where the sensor includes a cover or housing that is transparent to radar. The device where the angle guard is configured such that deforming the rear body cover toward the sensor causes the rear body cover to contact the angled guard before the rear body cover makes contact, if any, with the sensor. The device where the vertical guard and the angled guard each include a metal. The device where the metal includes an electrophoretically deposited coating. The device where the angled guard is configured to absorb energy by crumpling when contacted by the rear body cover. The device where the sensor is configured to detect objects in a blind spot of the vehicle. The device where the materials directed rearward by the rear wheel include water, mud, clay, slush, gravel, or debris. The device further including the vehicle.

One general aspect includes a method for protecting a sensor of a vehicle. The method includes attaching the sensor to the vehicle between a rear wheel of the vehicle and a rear body cover of the vehicle, where the sensor is configured to detect objects in proximity to the vehicle through the rear body cover; attaching a vertical guard to the vehicle, such that the sensor is protected from adhesion of materials directed rearward by the rear wheel of the vehicle; and coupling an angled guard to the vertical guard such that: the angled guard extends underneath the sensor and toward the rear body cover; and a portion of the rear body cover, through which the sensor emits a signal for detecting objects in proximity to the vehicle, is protected from adhesion of materials directed rearward by the rear wheel of the vehicle.

Implementations may include one or more of the following features. The method where the sensor includes a radar sensor, and the body portion of the vehicle is transparent to radar. The method where the sensor includes a cover or housing that is transparent to radar. The method further including coupling the angled guard to the vertical guard such that deforming the rear body cover toward the sensor causes the rear body cover to contact the angled guard before the rear body cover makes contact, if any, with the sensor. The method where the vertical guard and the angled guard each include a metal. The method where the metal includes an electrophoretically deposited coating. The method where the angled guard is configured to absorb energy by crumpling when contacted by the rear body cover. The method where the sensor is configured to detect objects in a blind spot of the vehicle. The method where the materials directed rearward by the rear wheel of the vehicle include water, mud, clay, slush, gravel, or debris.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the blind spot monitor guard, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

In accordance with at least one embodiment of the present disclosure, a vehicle blind spot monitor guard is provided that includes a shield or guard that can block splashing of external material from reaching the blind spot monitor (BSM) sensor area. In vehicles without an integrated underbody cover, this countermeasure may limit splashing of external material (mud, clay, sticky residue, etc.) that can build up on or aft of the BSM sensor, potentially leading to signal interference or other malfunctions. This may protect vehicle's BSM sensors and their surroundings from a loss of signal due to tire splash, while also providing additional protection to the BSM in the case of a rear impact collision.

The splash guard or blind spot monitor guard may be integrated into the BSM mounting bracket (which mounts to a body panel of the vehicle just forward of the rear bumper), and may allow enough clearance for electrical connectors, and also clearance to the bumper. After the required amount of clearance is met, the blind spot monitor guard itself may transition from a straight or vertical shape to an angled shape that extends below the BSM sensor unit. The guard can thus act as a barrier to block material that is splashed or flung upward and rearward by the rear tire under certain terrain and weather conditions. In some cases, the guard may be designed to cover the maximum area possible without causing signal interference. Some examples of the BSM guard can also provide protection to the BSM sensor in case of rear impact, by allowing the rear bumper cover to contact the integrated bracket first, rather than the BSM body directly. The BSM guard can thus protect the BSM unit from external (e.g., splashed) material that would interfere with the signal and operation of the radar sensor. It does this by blocking incoming material from reaching or adhering to the BSM area.

The present disclosure aids substantially in the detection of objects in a vehicle's blind spots, by improving the signal transmission and reception of the blind spot monitor in conditions where the tires are kicking up water, mud, clay, slush, or other materials. Implemented as part of the blind spot monitor mounting bracket, the blind spot monitor guard disclosed herein provides practical improvement in the operation of the blind spot monitor under inclement road conditions. This improved blind spot monitor functionality transforms a system that is vulnerable to inclement weather and road conditions into one that is more robust, without the normally routine need to attempt to clean mud and debris from locations that may be difficult to access. This unconventional approach improves the functioning of the vehicle, by enabling the blind spot monitor to operate under a wider range of conditions.

These descriptions are provided for exemplary purposes only, and should not be considered to limit the scope of the blind spot monitor guard. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
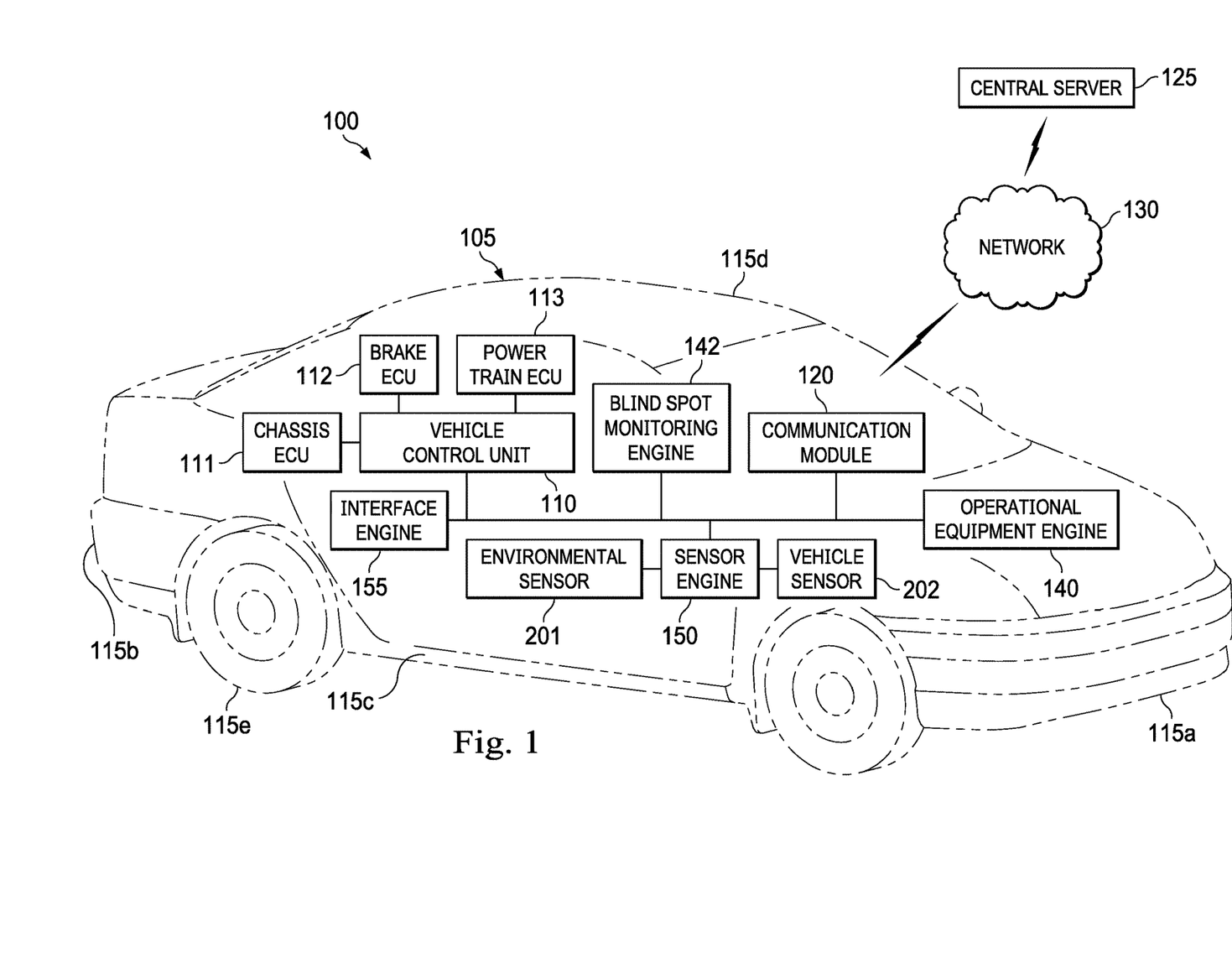
FIG. 1 is a diagrammatic illustration of a vehicle blind spot monitoring system in accordance with at least one embodiment of the present disclosure.

FIG. 1 is a diagrammatic illustration of a vehicle blind spot monitoring system in accordance with at least one embodiment of the present disclosure. In an example, a vehicle blind spot monitoring system is referred to by the reference numeral 100 and includes a vehicle 105, such as an automobile, and a vehicle control unit (VCU) 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, Bluetooth network, a dedicated short-range communications (DSRC), or any other suitable long-range or short-range communication network). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle blind spot monitoring system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a blind spot monitoring engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
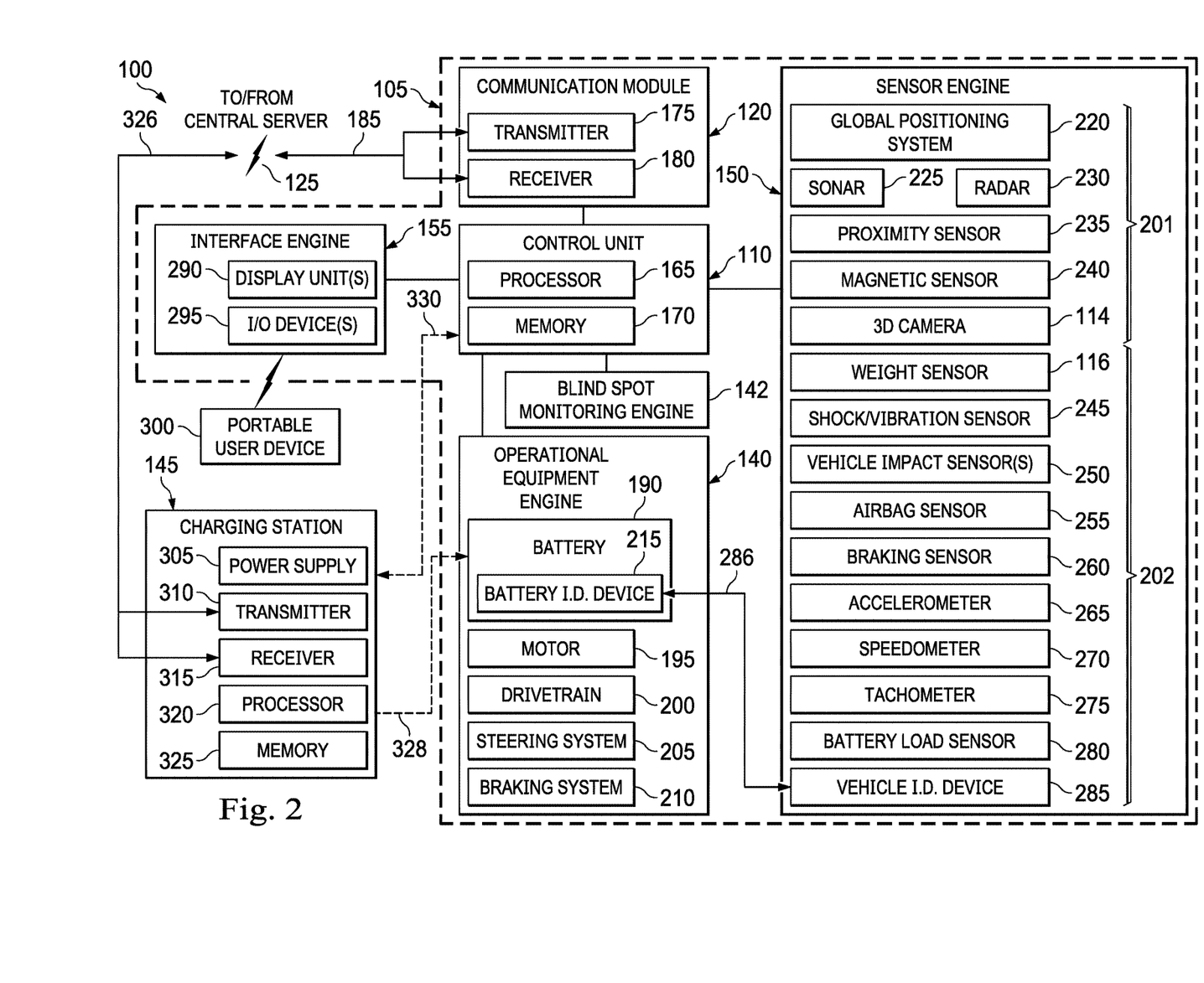
FIG. 2 is a diagrammatic block-diagram illustration of at least a portion of a vehicle including a blind spot monitoring system, in accordance with at least one embodiment of the present disclosure.

FIG. 2 is a diagrammatic illustration, in a block-diagram form, of at least a portion of a vehicle 105 including the blind spot monitoring system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a sonar sensor 225, a radar sensor 230, a proximity sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105. Accordingly, as used herein, the reference numeral 290 may refer to one, or any combination, of the display units. The I/O device 295 may be, include, or be part of a communication port (e.g., a USB port), a Bluetooth communication interface, a touch-screen display unit, buttons or soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

Also visible is a charging or fueling station 145, which may be configured to provide fuel or energy to the operational equipment engine 140, and may include components such as a power supply 305, transmitter 310, receiver 315, processor 320, and memory 325.

The vehicle blind spot monitoring system 100 also includes a blind spot monitoring engine 142, the operation of which will be described below. In some embodiments, the blind spot monitoring engine 142 comprises a standalone housing with its own processor and memory. In other embodiments, the blind spot monitoring engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the blind spot monitoring engine 142, receives data from sensors (e.g., one or more radar sensors 230) to detect obstacles (e.g., posts, pedestrians, other vehicles) that are located in the vehicle's blind spots and may not be visible to the vehicle driver through side view and rearview mirrors. Such obstacles may be reported with warning lights on the dashboard or mirrors.

A reader of ordinary skill in the art will understand that other components or arrangements of components may be found in a vehicle 105, and that the same general principles apply to electric vehicles, internal combustion vehicles, and hybrid vehicles.

Figure 3:
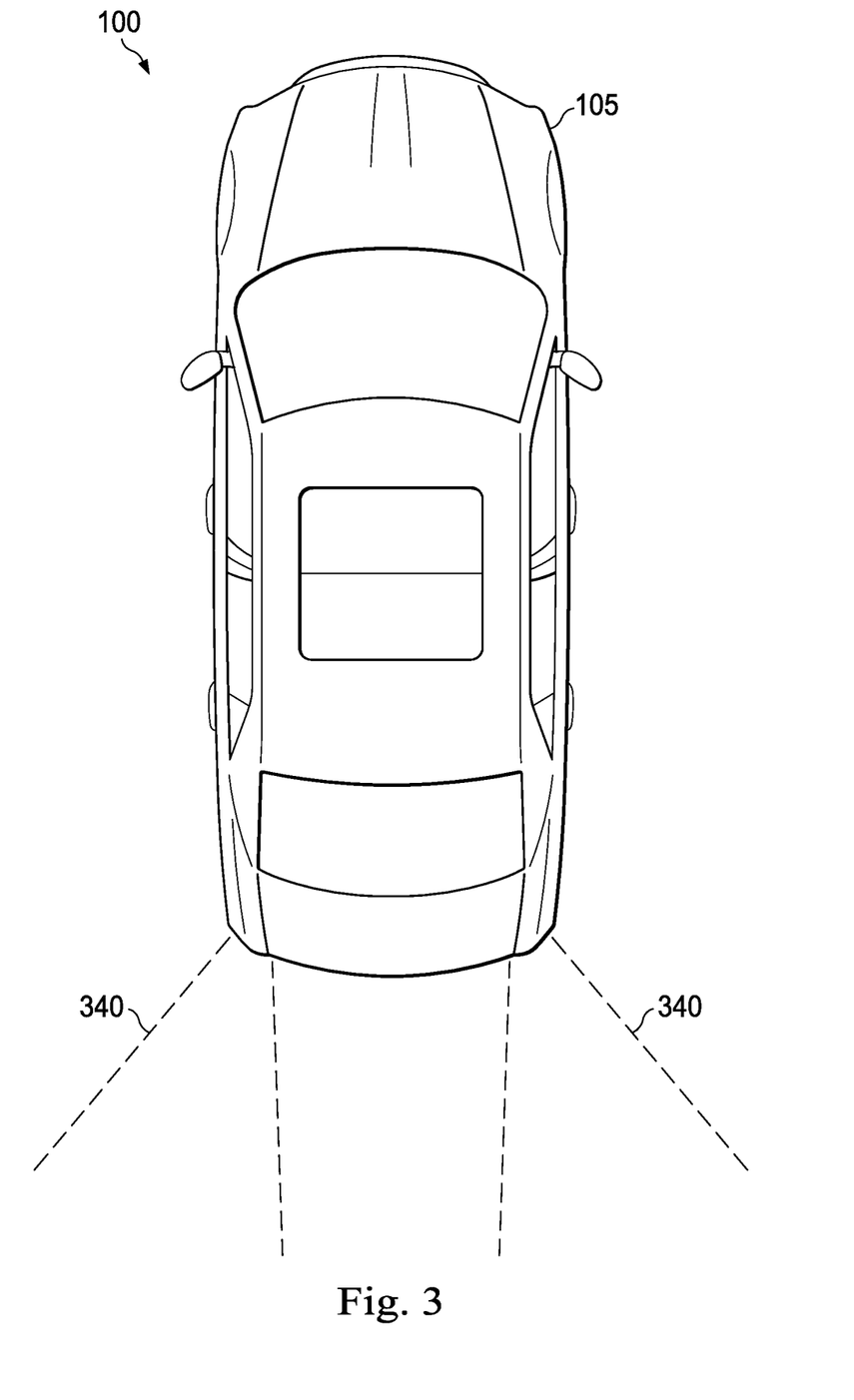
FIG. 3 is a diagrammatic top view of the blind spots of an example vehicle in accordance with at least one embodiment of the present invention.

FIG. 3 is a diagrammatic top view of the blind spots 340 of an example vehicle 105 in accordance with at least one embodiment of the present invention. The blind spots 340 represent regions behind the vehicle 105 which, due to the structure of the vehicle 105, are not directly visible by the vehicle's driver, either through rearview and side view mirrors or by the driver turning his or her head. The blind spot monitoring system 100 provides sensors (e.g., radar sensors 230) configured to detect objects (e.g., pedestrians, posts, other vehicles) that may be present in the blind spots 340, as described below.

Figure 4:
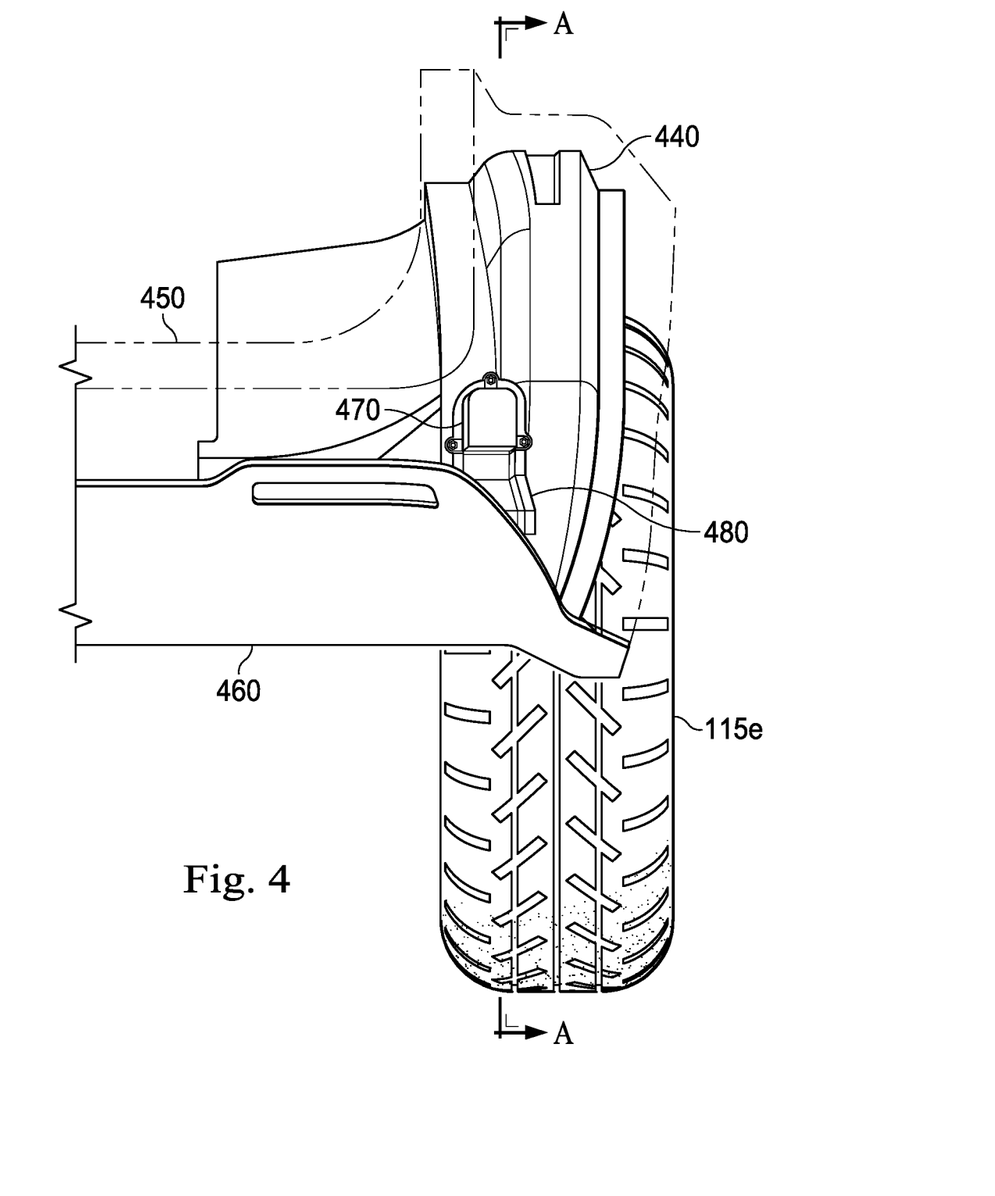
FIG. 4 is a partially transparent view of a rear tire area of a vehicle that includes a blind spot monitor guard in accordance with at least one embodiment of the present disclosure.

FIG. 4 is a partially transparent view of a rear tire area of a vehicle that includes a blind spot monitor guard 480 in accordance with at least one embodiment of the present disclosure. In some examples, the blind spot monitor guard 480 covers a blind spot monitor 470 that may include a sensor (e.g., a radar sensor 230), and may be or include a blind spot monitoring engine 142. In other examples, the blind spot monitor 470 may be in communication with the blind spot monitoring engine 142. Visible are a wheel or tire 115e, fender liner 440, upper rear bumper assembly 450, lower rear bumper assembly 460, blind spot monitor 470, blind spot monitor guard 480, and cross-section plane A-A.

Figure 5:
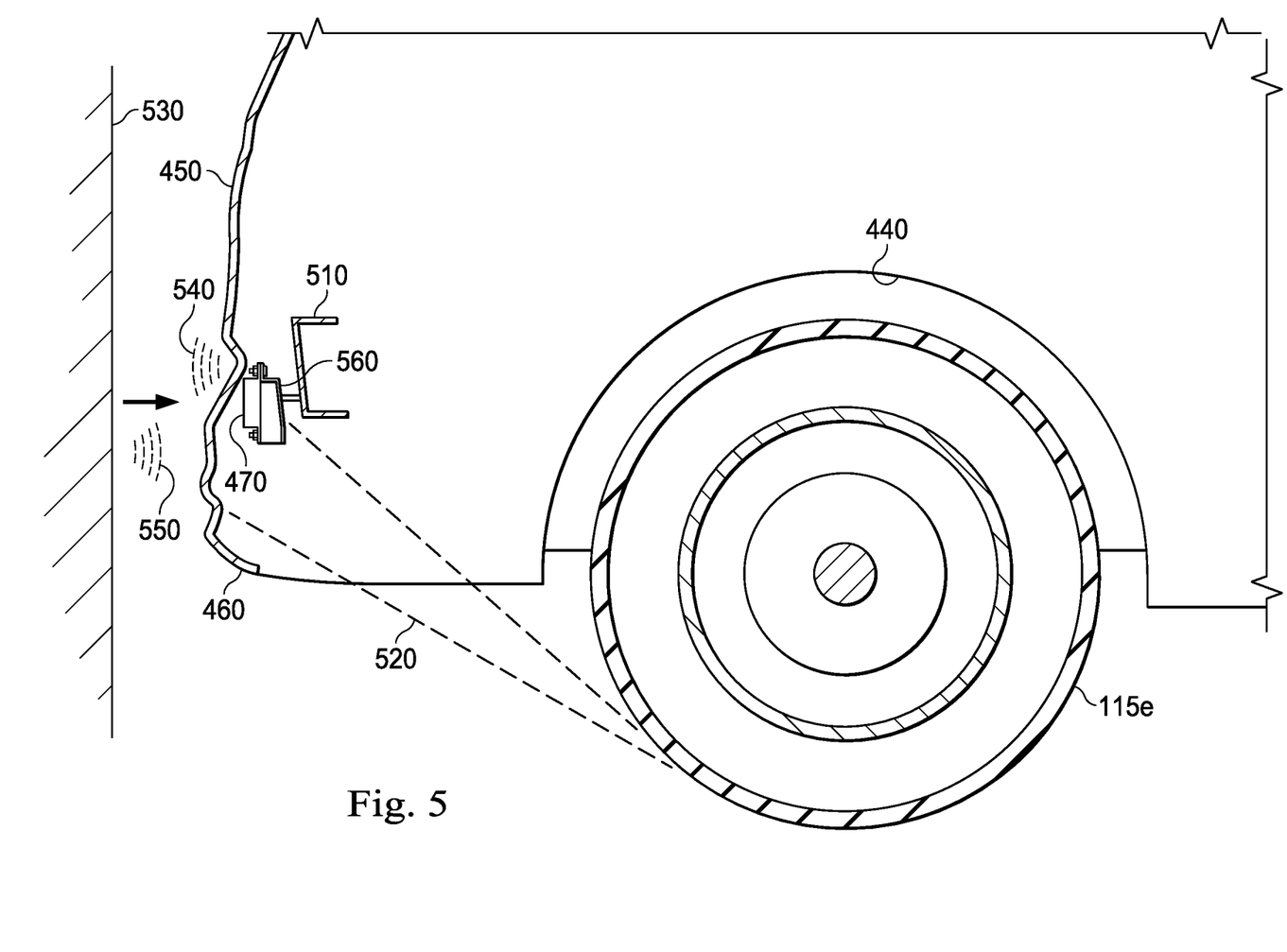
FIG. 5 is a cross-sectional view of a rear tire area of a vehicle that includes a blind spot monitor in accordance with at least one embodiment of the present disclosure.

FIG. 5 is a cross-sectional view of a rear tire area of a vehicle that includes a blind spot monitor 470 in accordance with at least one embodiment of the present disclosure. This view represents a cross-section through plane A-A as shown in FIG. 4. Visible are the wheel or tire 115e, fender liner 440, upper rear bumper assembly 450, lower rear bumper assembly 460, blind spot monitor 470, and a side outer panel 510 to which the blind spot monitor 470 is attached via a blind spot monitor mounting bracket 560. Also visible is tire spray 520 and an approaching object 530, along with outbound signals 540 from, and return signals 550 to, the blind spot monitor 470. In an example, the signals 540 and 550 are radar signals generated and received by a radar sensor 230 as shown for example in FIG. 2, that transmits and receives through the upper rear bumper assembly 450 and/or lower rear bumper assembly 460, which may be configured such that they are transparent to the signals 540 and 550. For example, the bumper assemblies 450 and/or 460 may be transparent to radar.

In an example, the tire spray 520 includes water, mud, clay, slush, gravel, and/or other debris that is kicked up by the tire and flung rearward and upward toward the blind spot monitor. Where this tire spray material 520 travels in between the blind spot monitor 470 and the approaching object 530, a temporary interference can occur that disrupts the outbound signals 540 and/or inbound signals 550. Where at least a portion of the tire spray material 520 adheres to the interior of the upper rear bumper assembly 450 or the lower rear bumper assembly 460, or to the blind spot monitor 470 itself, the tire spray material 520 may cause long-term interference with the outbound signals 540 and/or return signals 550.

In an example, if the approaching object 530 makes contact with the upper rear bumper assembly 450 or lower rear bumper assembly 460, the upper rear bumper assembly 450 or lower rear bumper assembly 460 may be deformed such that it contacts the blind spot monitor 470, potentially squeezing the blind spot monitor 470 in between the bumper assemblies 450/460 and the side outer panel 510 and thus potentially damaging or destroying the blind spot monitor 470.

In some cases, the rear bumper assemblies 450 or 460 may be referred to as rear body covers, and/or the blind spot monitor 470 may transmit and receive signals through other body covers or panels of the vehicle.

Figure 6:
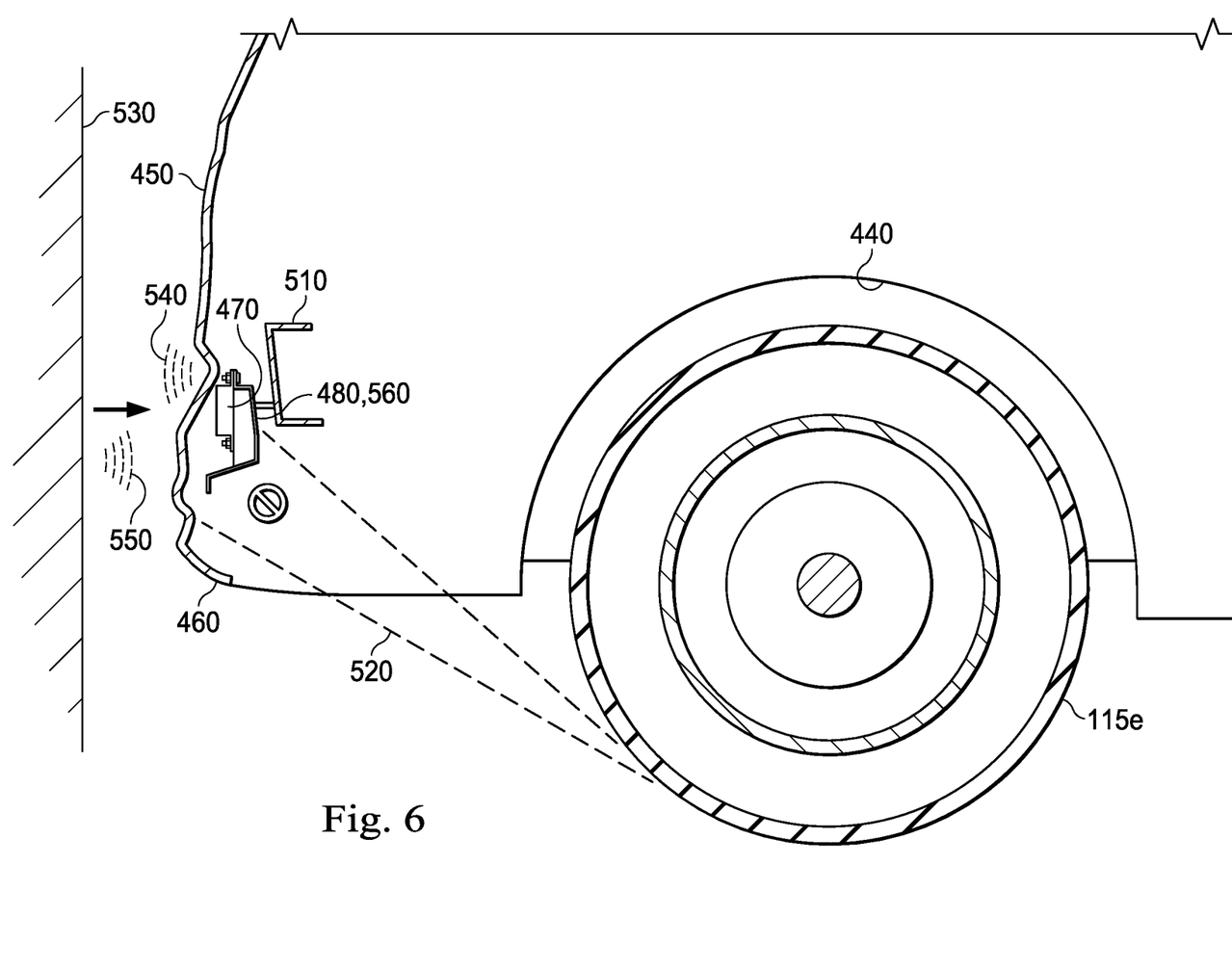
FIG. 6 is a cross-sectional view of a rear tire area of a vehicle that includes a blind spot monitor guard in accordance with at least one embodiment of the present disclosure.

FIG. 6 is a cross-sectional view of a rear tire area of a vehicle that includes a blind spot monitor guard 480 in accordance with at least one embodiment of the present disclosure. This view represents a cross-section through plane A-A as shown in FIG. 4. Visible are the wheel or tire 115e, fender liner 440, upper rear bumper assembly 450, lower rear bumper assembly 460, blind spot monitor 470, and a side outer panel 510 to which the blind spot monitor 470 is attached. Also visible is tire spray 520 and an approaching object 530, along with outbound signals 540 from, and return signals 550 to, the blind spot monitor 470. In an example, the signals 540 and 550 are radar signals generated and received by a radar sensor 230 as shown for example in FIG. 2. Also included is a blind spot monitor guard 480, which may be part of, or may serve as, a blind spot monitor mounting bracket 560 to attach the blind spot monitor 470 to the side outer panel 510, or to another portion of the vehicle 105.

In an example, the blind spot monitor guard 480 is configured to limit the opportunity for tire spray material 520 to travel in between the blind spot monitor 470 and the approaching object 530, or to adhere to the interior of the upper rear bumper assembly 450 or the lower rear bumper assembly 460, or to the blind spot monitor 470 itself. Rather, the tire spray material 520 may be deflected by, or may adhere to, the blind spot monitor guard 480 in such a way that it cannot interfere with the outbound signals 540 and/or return signals 550 of the blind spot monitor 470.

In an example, if the approaching object 530 collides with the upper rear bumper assembly 450 or lower rear bumper assembly 460, the upper rear bumper assembly 450 or lower rear bumper assembly 460 may be deformed such that it contacts the blind spot monitor guard 480. In this example, the blind spot monitor guard 480 may absorb at least some of the collision energy, thus preventing, reducing, or delaying contact between the rear bumper assemblies 450/460 and the blind spot monitor 470, thus reducing the risk of damage to the blind spot monitor 470, particularly in low-speed collisions.

Figure 7:
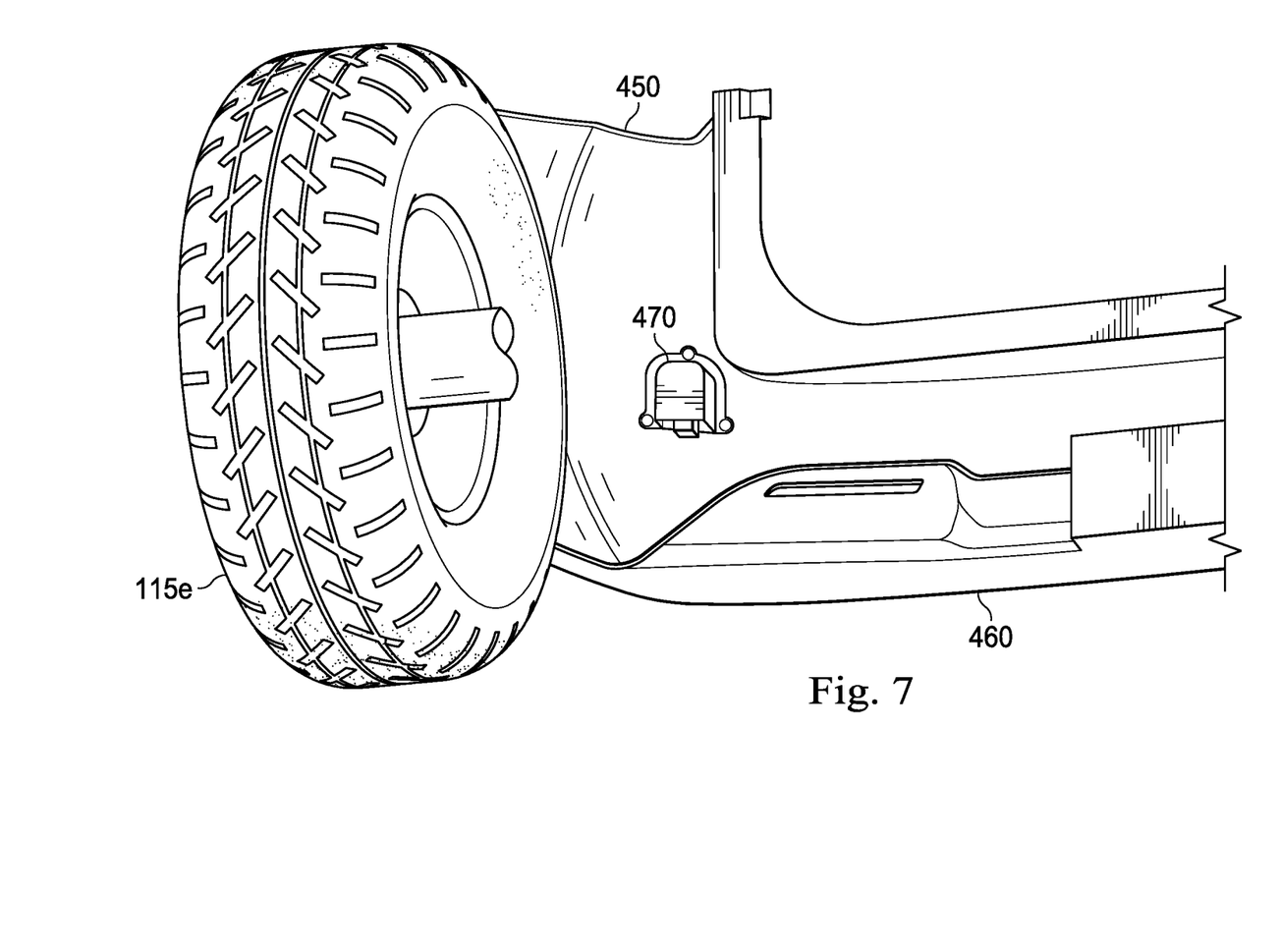
FIG. 7 is a perspective view of a rear tire area of a vehicle that includes a blind spot monitor in accordance with at least one embodiment of the present disclosure.

FIG. 7 is a perspective view of a rear tire area of a vehicle that includes a blind spot monitor in accordance with at least one embodiment of the present disclosure. Visible are the wheel or tire 115e, upper rear bumper assembly 450, lower rear bumper assembly 460, and blind spot monitor 470. In this example, the blind spot monitor is attached to the side outer panel 510 such that it can transmit outbound signals toward, and receive return signals from, any objects that may be located in a blind spot of the vehicle. In an example, the blind spot monitor 470 comprises a radar sensor housed behind a cover or within a housing made of a polymer resin, although other types of blind spot monitor may be used instead or in addition. Not shown in this view is the side outer panel 510 (or other body panel) to which the blind spot monitor 470 is attached.

Figure 8:
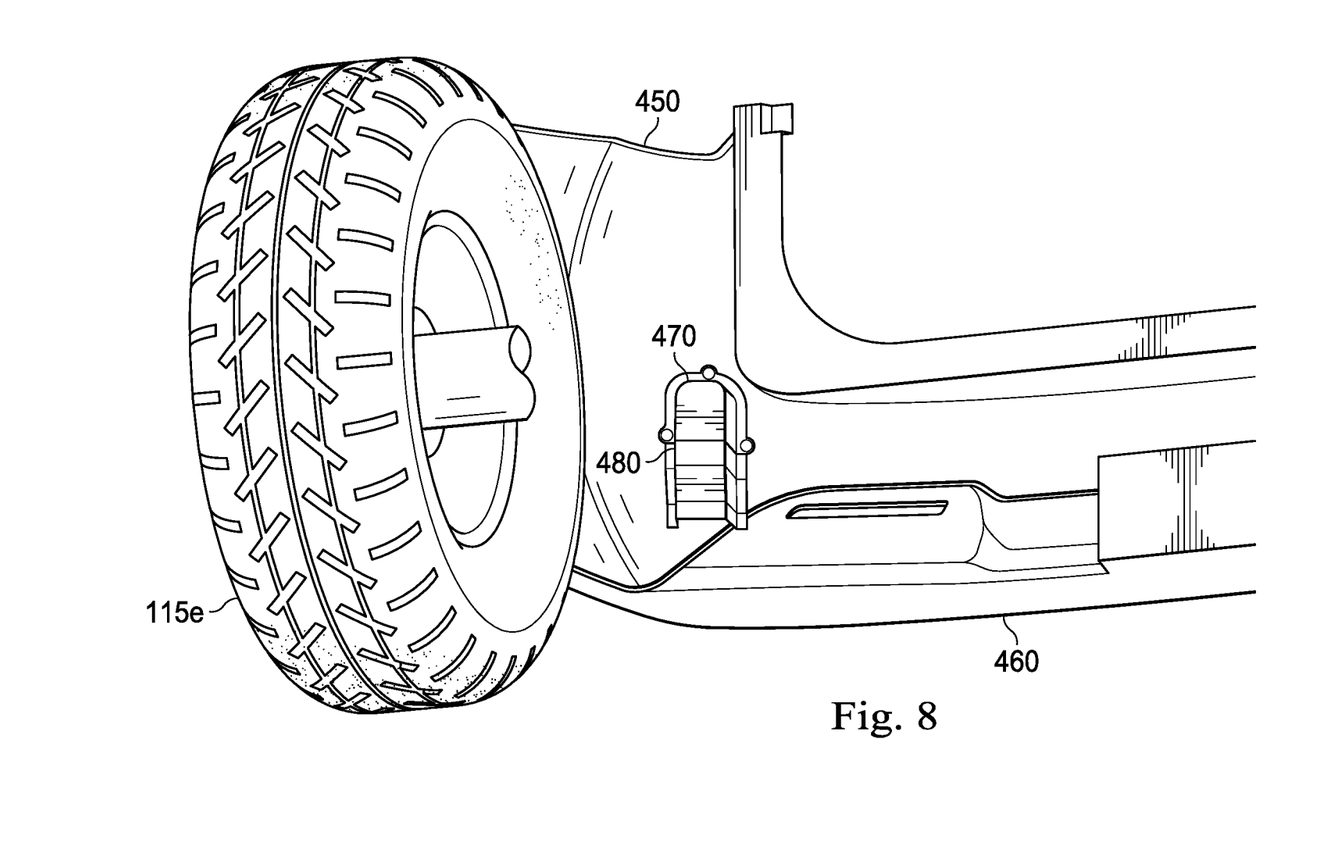
FIG. 8 is a perspective view of a rear tire area of a vehicle that includes a blind spot monitor guard in accordance with at least one embodiment of the present disclosure.

FIG. 8 is a perspective view of a rear tire area of a vehicle that includes a blind spot monitor guard in accordance with at least one embodiment of the present disclosure. Visible are the wheel or tire 115*e*, upper rear bumper assembly 450, lower rear bumper assembly 460, and blind spot monitor 470. In this example, the blind spot monitor is attached to the side outer panel 510 (not pictured), and has a blind spot monitor guard 480 extending below it. In the pictured embodiment, the blind spot monitor guard 480 has a straight profile extending downward from the blind spot monitor 470. In an example, the blind spot monitor 470 is between 75 mm and 90 mm tall, between 60 mm and 80 mm wide, and between 15 mm and 25 mm deep, while the blind spot monitor guard 480 is between 100 mm and 200 mm tall, between 60 mm and 160 mm wide, and between 25 mm and 100 mm deep, although other values both larger and smaller may be used instead or in addition.

Figure 9:
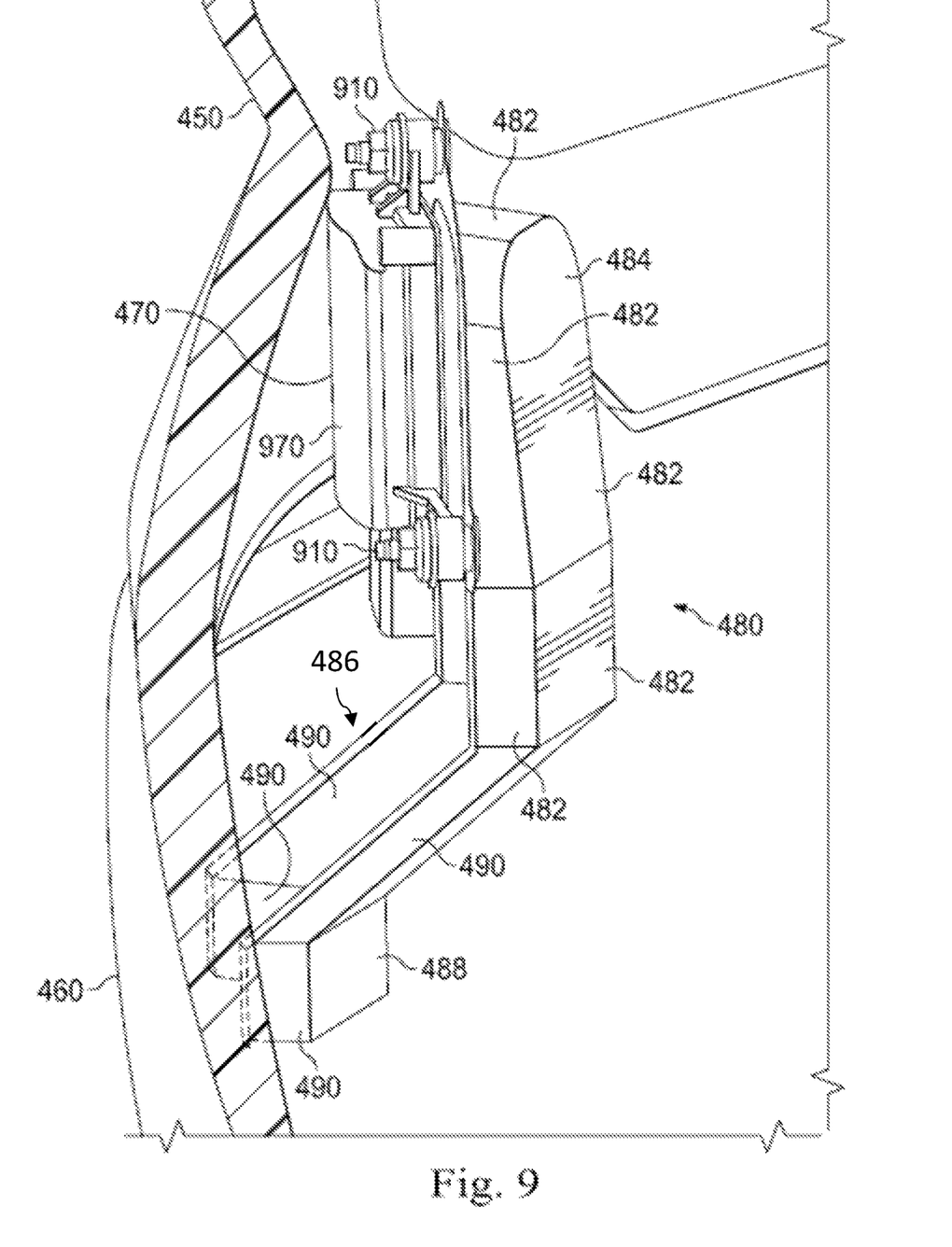
FIG. 9 is a perspective view of a rear bumper area of a vehicle that includes a blind spot monitor guard in accordance with at least one embodiment of the present disclosure.

FIG. 9 is a perspective view of a rear bumper area of a vehicle that includes a blind spot monitor guard 480 in accordance with at least one embodiment of the present disclosure. In this example, the blind spot monitor 470 and blind spot monitor guard 480 are attached to the side outer panel 510 (not pictured), or to another portion of the vehicle 105, by fasteners 910. Also visible are the upper rear bumper assembly 450 and lower rear bumper assembly 460. In this example, the blind spot monitor guard 480 includes a vertical portion or vertical guard 484 that extends roughly parallel to the blind spot sensor 470, and an angled portion or angled guard 486 that extends below and rearward from the blind spot monitor 470, such that the angled portion 486 is able to block water, mud, clay, slush, and debris from being splashed onto the interior surfaces of the upper rear bumper assembly and lower rear bumper assembly, or onto the rear face 970 of the blind spot monitor 470. The blind spot monitor guard may also include a bottom portion 488, which in this example is also vertical, although other configurations may be used instead or in addition. Depending on the implementation, the vertical portion 484 may deviate from the vertical by up to ±40 degrees, and may include multiple faces 482 that are angled from one another. The angled portion 486 may extend downward and backward from the vertical portion 484 at an angle of between 30 degrees and 75 degrees from the vertical, and may have a length between 50% and 150% of the height of the vertical portion 484. The bottom portion 488 may have a length between 15% and 50% of the height of the vertical portion 484. In an example, the angled portion 486 and/or bottom portion 488 may include stiffening rails 490. Other embodiments may include stiffening beads instead or in addition.

In an example, the blind spot monitor guard 480 is made of a metal such as galvanized steel with an electrophoretically deposited (EPD) coating, such that mud, clay, debris, and other materials do not stick easily to its surface. However, even if mud, clay, debris, or other materials do stick to the blind spot monitor guard 480, the blind spot monitor guard 480, including the angled portion 486, are sized, shaped, and positioned such that no portion of the blind spot monitor guard 480 occludes the rear face 970 of the blind spot monitor 470. Thus, signals emitted or received by the blind spot monitor 470 through the rear face 970 are not blocked or attenuated by any mud, clay, debris, or other material that adheres to the blind spot monitor guard 480.

In an example, an object collision that deforms the lower rear bumper assembly 460 will cause the lower rear bumper assembly 460 to contact the angled portion 486 before contacting the blind spot monitor 470. In some embodiments, the angled portion 486 is designed to absorb or dissipate a certain amount of crash energy by crumpling.

Figure 10:
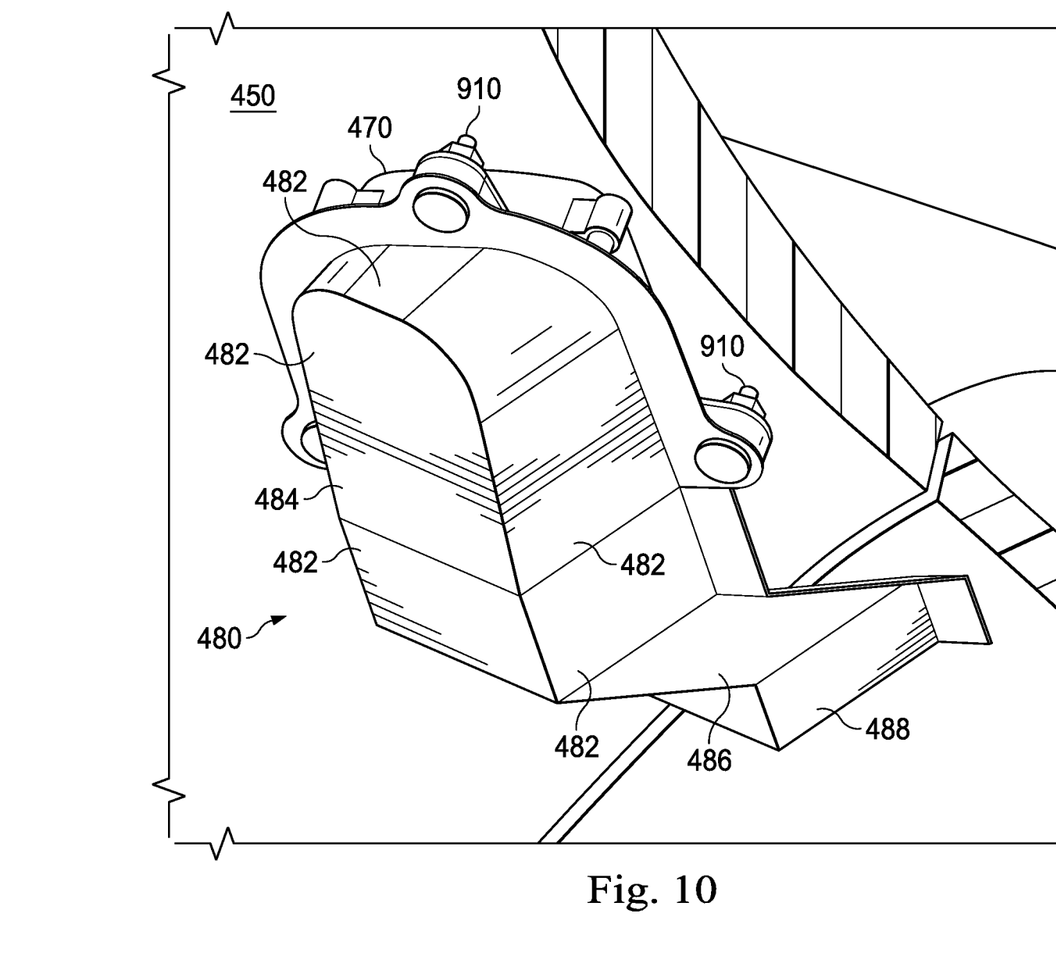
FIG. 10 is a perspective view of a rear bumper area of a vehicle that includes a blind spot monitor guard in accordance with at least one embodiment of the present disclosure.

FIG. 10 is a perspective view of a rear bumper area of a vehicle that includes a blind spot monitor guard 480 in accordance with at least one embodiment of the present disclosure. Visible are the blind spot monitor 470, blind spot monitor guard 480, vertical portion 484, angled portion 486, upper rear bumper assembly 450, and fasteners 910. In some embodiments, the faces 482 of the vertical portion 484 may be configured such that the blind spot monitor guard 480 is asymmetrical. In the example shown in FIG. 10, the left side of the blind spot monitor guard 480 has a different depth than the right side of the blind spot monitor guard. Not shown in this view is the side outer panel 510 (or other body panel) to which the blind spot monitor 470 and blind spot monitor guard 480 are attached.

Figure 11:
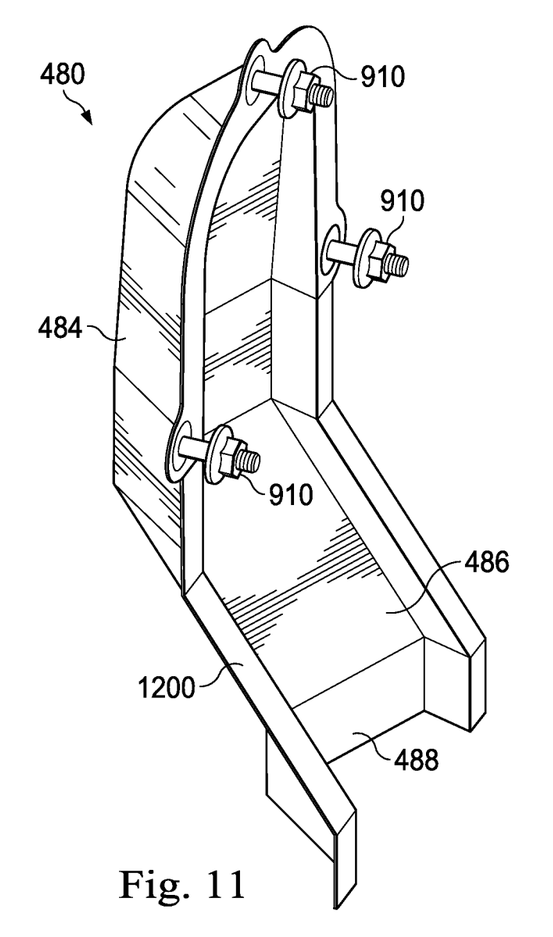
FIG. 11 is a perspective view of a blind spot monitor guard in accordance with at least one embodiment of the present disclosure.

FIG. 11 is a perspective view of a blind spot monitor guard 480 in accordance with at least one embodiment of the present disclosure. Visible are the blind spot monitor guard 480, including the vertical portion 484, angled portion 486, bottom portion 488, and the fasteners 910. Also visible is a flange 1200 that, in some embodiments, extends from at least a portion of the edge or perimeter of the blind spot monitor guard 480.

Figure 12:
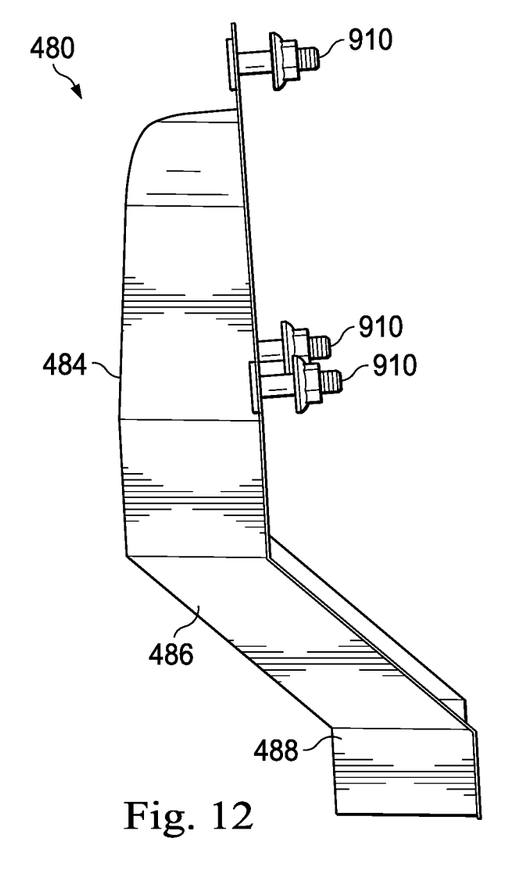
FIG. 12 is a side perspective view of a blind spot monitor guard in accordance with at least one embodiment of the present disclosure.

FIG. 12 is a side perspective view of a blind spot monitor guard 480 in accordance with at least one embodiment of the present disclosure. Visible are the blind spot monitor guard 480, including the vertical portion 484, angled portion 486, bottom portion 488, and the fasteners 910.

As will be readily appreciated by those having ordinary skill in the art after becoming familiar with the teachings herein, the blind spot monitor guard advantageously protects the blind spot monitor from signal interference due to splashed water, mud, clay, and debris, and also protects the blind spot monitor against low-speed collisions between approaching objects and the rear bumper assembly. Depending on the implementation, a number of variations are possible on the examples and embodiments described above. For example, the blind spot monitor may use a variety of different sensors, including radar, sonar, lidar, infrared, and 2D or 3D cameras. It is understood that different sensor types or sensor configurations may have different size, power, and packaging needs than the sensors described herein. Furthermore, different vehicle designs may have blind spots of different size, shape, and location than shown herein. Accordingly, the blind spot monitor may have a different size, shape, position, or attachment than is shown herein, and the blind spot monitor guard may therefore have a different size, shape, or attachment than is shown herein, while nevertheless conforming to the spirit of the present disclosure. The blind spot monitor guard may be fashioned as part of the blind spot monitor bracket and/or as part of the blind spot monitor itself, such that the blind spot monitor has a sensor portion, a vertical guard portion, and an angled guard portion. The blind spot monitor guard may be located proximate to other body portions of the vehicle than the bumper assembly. The technology disclosed herein may be applied to different vehicle types, including on-road and off-road vehicles with two, three, four or more wheels, and may also be applied to aircraft.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the blind spot monitor guard. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the blind spot monitor guard as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A sensor device comprising:
    a sensor configured to be attached between a rear wheel of a vehicle and a rear body cover of the vehicle, wherein the sensor is configured to detect objects in proximity to the vehicle through the rear body cover;
    a vertical guard configured to be attached to the vehicle, such that the sensor is protected from adhesion of materials directed rearward by the rear wheel; and
    an angled guard coupled to the vertical guard and extending underneath the sensor and towards the rear body cover, wherein a portion of the rear body cover, through which the sensor emits a signal for detecting objects in proximity to the vehicle, is protected from adhesion of materials directed rearward by the rear wheel, wherein the angle guard is configured such that deforming the rear body cover toward the sensor causes the rear body cover to contact the angled guard before the rear body cover makes contact, if any, with the sensor.

2. The device of claim 1, wherein the sensor comprises a radar sensor, and wherein the rear body cover is transparent to radar.

3. The device of claim 2, wherein the sensor comprises a cover or housing that is transparent to radar.

4. The device of claim 1, wherein the vertical guard and the angled guard each comprise a metal.

5. The device of claim 4, wherein the metal comprises an electrophoretically deposited coating.

6. The device of claim 4, wherein when the angled guard is configured to absorb energy by crumpling when contacted by the rear body cover.

7. The device of claim 1, wherein the sensor is configured to detect objects in a blind spot of the vehicle.

8. The device of claim 1, wherein the materials directed rearward by the rear wheel comprise water, mud, clay, slush, gravel, or debris.

9. The device of claim 1, further comprising the vehicle.

10. A method for protecting a sensor of a vehicle comprising:
    attaching the sensor to the vehicle between a rear wheel of the vehicle and a rear body cover of the vehicle, wherein the sensor is configured to detect objects in proximity to the vehicle through the rear body cover;
    attaching a vertical guard to the vehicle, such that the sensor is protected from adhesion of materials directed rearward by the rear wheel of the vehicle;
    coupling an angled guard to the vertical guard such that:
    the angled guard extends underneath the sensor and toward the rear body cover; and
    a portion of the rear body cover, through which the sensor emits a signal for detecting objects in proximity to the vehicle, is protected from adhesion of materials directed rearward by the rear wheel of the vehicle; and
    coupling the angled guard to the vertical guard such that deforming the rear body cover toward the sensor causes the rear body cover to contact the angled guard before the rear body cover makes contact, if any, with the sensor.

11. The method of claim 10, wherein the sensor comprises a radar sensor, and wherein the body portion of the vehicle is transparent to radar.

12. The method of claim 11, wherein the sensor comprises a cover or housing that is transparent to radar.

13. The method of claim 10, wherein the vertical guard and the angled guard each comprise a metal.

14. The method of claim 13, wherein the metal comprises an electrophoretically deposited coating.

15. The method of claim 13, wherein the angled guard is configured to absorb energy by crumpling when contacted by the rear body cover.

16. The method of claim 10, wherein the sensor is configured to detect objects in a blind spot of the vehicle.

17. The method of claim 10, wherein the materials directed rearward by the rear wheel of the vehicle comprise water, mud, clay, slush, gravel, or debris.

* * * * *